(12) United States Patent
Wurzer et al.

(10) Patent No.: US 9,896,028 B1
(45) Date of Patent: Feb. 20, 2018

(54) LIGHT ASSEMBLY FOR ATTACHMENT TO A VEHICLE

(71) Applicants: Adam J. Wurzer, Carroll, IA (US);
Terry D. Wurzer, Panora, IA (US);
David T. Wurzer, Carroll, IA (US)

(72) Inventors: Adam J. Wurzer, Carroll, IA (US);
Terry D. Wurzer, Panora, IA (US);
David T. Wurzer, Carroll, IA (US)

( * ) Notice: Subject to any disclaimer, the term of this patent is extended or adjusted under 35 U.S.C. 154(b) by 0 days.

(21) Appl. No.: 15/215,984

(22) Filed: Jul. 21, 2016

(51) Int. Cl.
| B60Q 1/00 | (2006.01) |
| B60Q 3/00 | (2017.01) |
| B60Q 1/32 | (2006.01) |
| B60Q 1/30 | (2006.01) |
| B60Q 1/28 | (2006.01) |
| B60Q 1/26 | (2006.01) |

(52) U.S. Cl.
CPC ............. *B60Q 1/32* (2013.01); *B60Q 1/0088* (2013.01); *B60Q 1/2615* (2013.01); *B60Q 1/28* (2013.01); *B60Q 1/30* (2013.01); *B60Q 2400/20* (2013.01)

(58) Field of Classification Search
CPC .......... B60Q 1/32; B60Q 1/30; B60Q 1/0088; B60Q 1/2615; B60Q 1/28; B60Q 2400/20
USPC .......................................................... 362/545
See application file for complete search history.

(56) References Cited

U.S. PATENT DOCUMENTS

| 1,737,398 A * | 11/1929 | Ackerman | B60Q 1/30 340/433 |
| 5,025,350 A * | 6/1991 | Tienken | B60Q 1/32 362/238 |
| 6,149,288 A * | 11/2000 | Huang | B60Q 1/2615 362/459 |
| 7,497,606 B1 * | 3/2009 | Tsai | B60Q 1/2607 362/516 |
| 2006/0202850 A1 * | 9/2006 | Hefright | B60Q 1/2696 340/815.45 |
| 2007/0102609 A1 * | 5/2007 | Nebeker | B60Q 1/2611 248/291.1 |
| 2009/0051506 A1 * | 2/2009 | Hicksted | B60Q 1/2611 340/332 |
| 2013/0051059 A1 * | 2/2013 | Abai | B60Q 1/068 362/523 |
| 2013/0155713 A1 * | 6/2013 | Law | B60Q 1/34 362/545 |
| 2013/0249394 A1 * | 9/2013 | Fay | B60Q 1/0088 315/77 |
| 2014/0268858 A1 * | 9/2014 | Norris | F21S 48/22 362/545 |

* cited by examiner

*Primary Examiner* — Donald Raleigh
(74) *Attorney, Agent, or Firm* — Dennis L. Thomte; Thomte Patent Law Office LLC (57) ABSTRACT

A light assembly for attachment to a vehicle such as a truck wherein the light assembly includes a rigid support member having a first end, a second end, a first side edge, a second side edge, a first side and a second side. In a first embodiment, a plurality of spaced-apart light members are secured to the support member. In a second embodiment, an elongated light bar is secured to the support member. In both embodiments, an L-shaped channel member is provided at one of the side edges of the support member thereof to not only strengthen the support member but to provide a channel for partially receiving the electrical wires of the light members.

2 Claims, 9 Drawing Sheets

LIGHT ASSEMBLY FOR ATTACHMENT TO A VEHICLE

BACKGROUND OF THE INVENTION

Field of the Invention

This invention relates to a light assembly for attachment to a vehicle such as a truck or the like. More particularly, this invention relates to a glow light assembly which may be secured to various parts of the truck such as the front bumper of the truck, the running boards of the truck, the cab of the truck, the cab panels of the truck, the frame of the truck, the sleeper cab of the truck, etc. The light assembly could also be attached to the trailer which is pulled by the truck.

Description of the Related Art

Light strips have been used for several years for attachment to a vehicle such as a truck to accent the truck. To the best of applicants' knowledge, the prior art light strips include an elongated strip of flexible material having a plurality of spaced-apart lights such as glow lights mounted thereon. The flexible strip is adhesively secured to various parts of the truck. However, when subjected to the elements such as rain or the like, the adhesive strip becomes loosened and falls from the truck. Further, the prior art light strips do not have any structure to maintain the electrical wires of the light strips to the elongated strip of flexible material with the result being that the electrical wires hang downwardly from the strip of flexible material.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The light assembly is disclosed for attachment to a vehicle such as a truck or the like. The light assembly could also be attached to a trailer which is being pulled by the truck. The light assembly includes a generally flat support member having a first end, a second end, a first side edge, a second side edge, a first side and a second side. The support member is comprised of a rigid material such as plastic or metal. At least one light member is secured to the support member which directs light away from the second side thereof. The light member may be a glow light, an LED light, a colored light, or an indirect light.

The support member is configured to be attached to any part of the truck. The support member has an L-shaped channel member at one side edge thereof which not only strengthens the support member but which also provides a pocket into which the electrical wires or leads of the light members are positioned. In a second embodiment of the invention, an elongated light bar is secured to the support member.

It is therefore a principal object of the invention to provide an improved light assembly for attachment to a vehicle such as a truck.

A further object of the invention is to provide a light assembly which includes a generally rectangular support member which is comprised of a rigid plastic or metal material.

A further object of the invention is to provide a light assembly of the type described which includes a channel member for receiving the electrical wires or leads of the light members attached to the support member.

A further object of the invention is to provide a light assembly for attachment to a truck or the like wherein the light assembly is rigidly connected to any part of the truck.

A further object of the invention is to provide a light assembly of the type described which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the light assembly of this invention which is configured to be attached to a vehicle such as a truck 12. Truck 12 includes a cab 14, frame 16, front bumper 18, sleeper cab 20 and side panels 22. The light assembly 10 is configured to be attached to any part of the truck 12 or the trailer which is being pushed by the truck 12. The light assembly 10 will normally be used to direct light downwardly from the light assembly but may be used to direct light side-ways or upwardly. The description of the invention will assume that the light assembly 10 is horizontally disposed and will direct light downwardly therefrom to function as an accent light.

Figure 2:
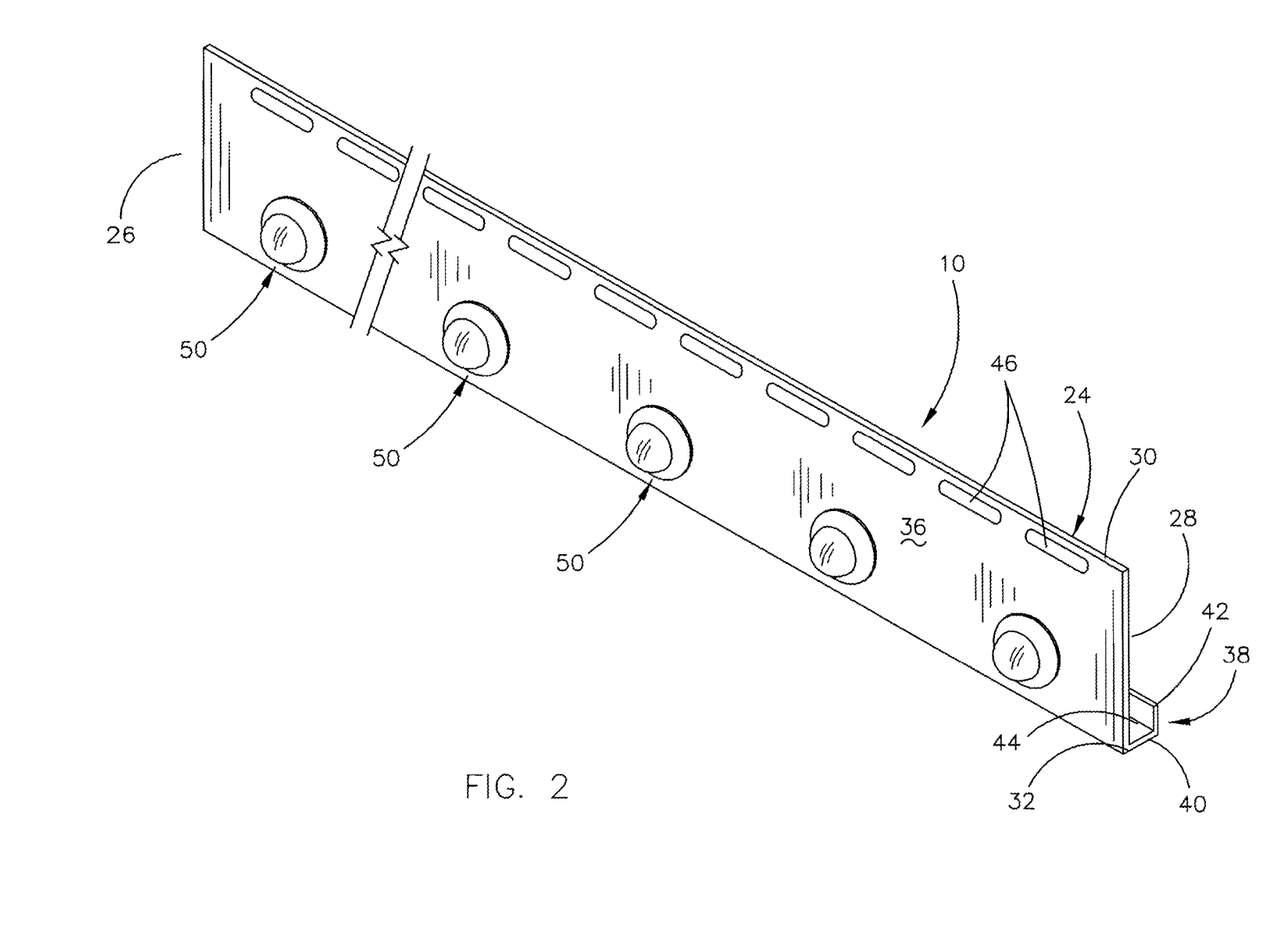
FIG. 2 is a partial perspective view of the light assembly of this invention.
Figure 3:
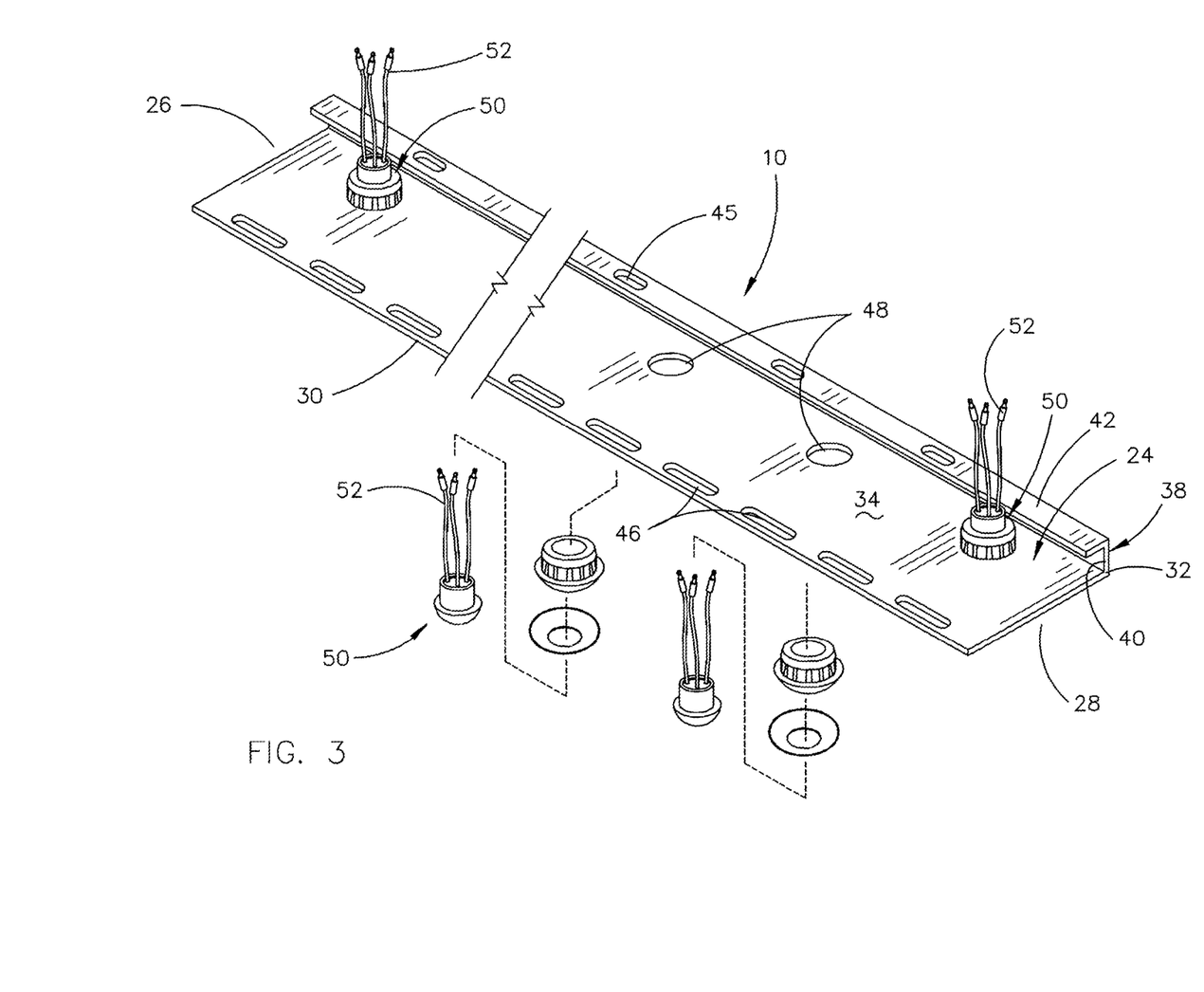
FIG. 3 is a partial perspective exploded view of the light assembly of this invention.
Figure 4:
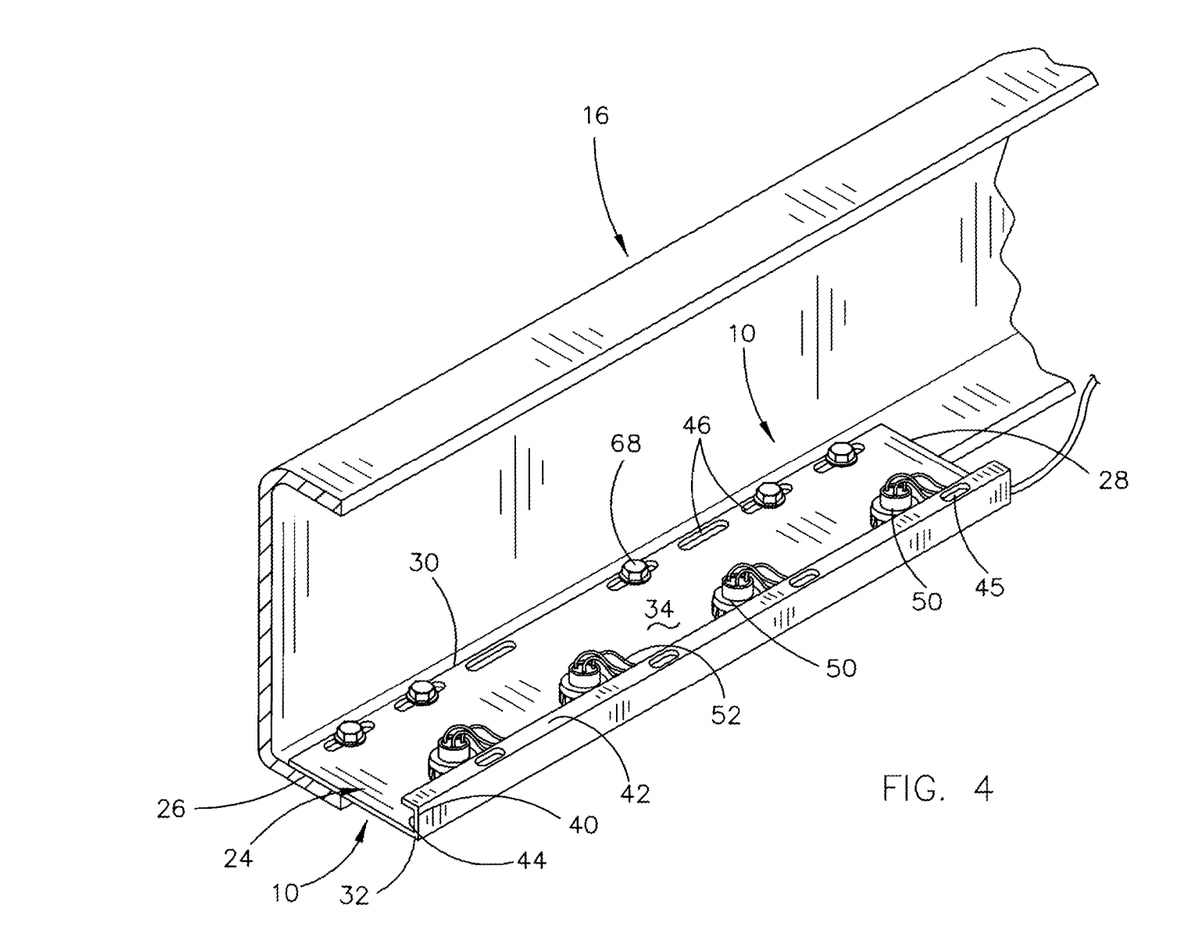
FIG. 4 is a partial perspective view of the light assembly of this invention secured to a frame member of the vehicle.
Figure 5:
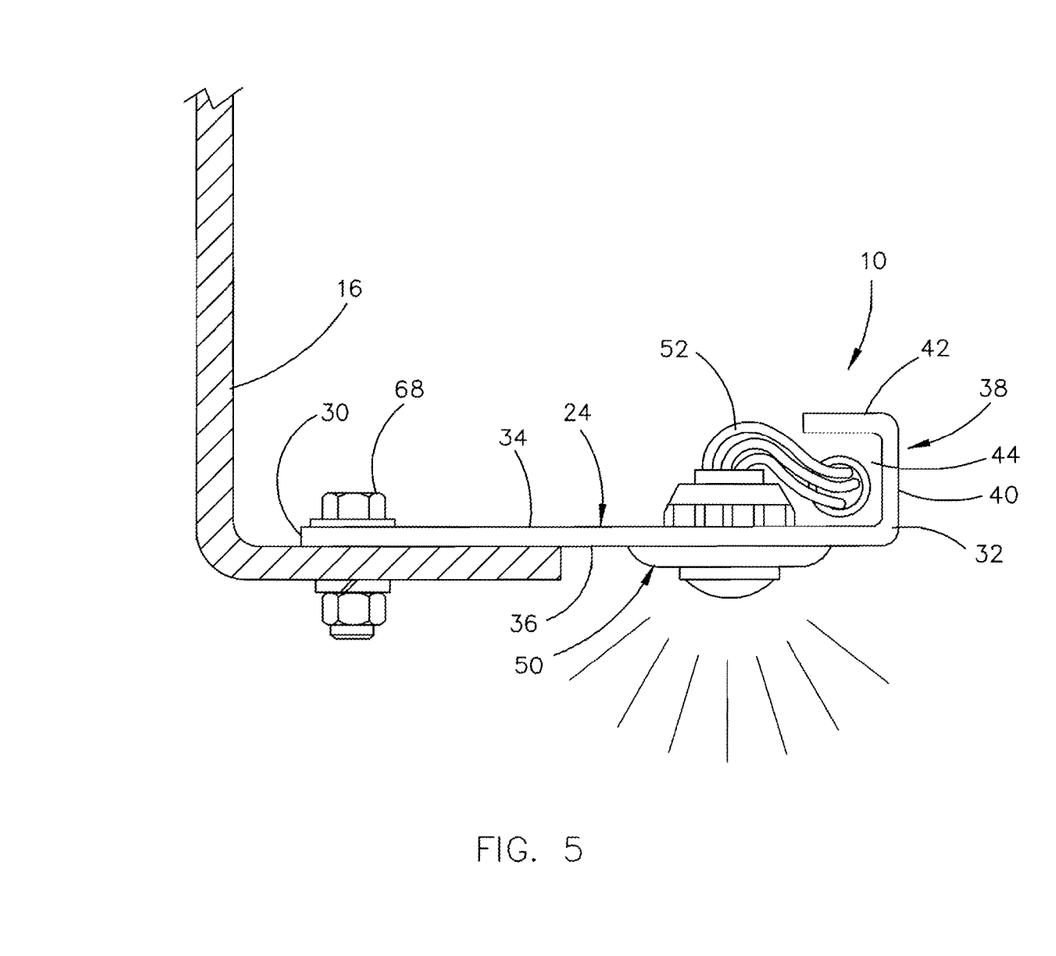
FIG. 5 is a sectional view illustrating the light assembly of this invention secured to the frame member of the truck.

Light assembly 10 includes an elongated support member 24 which is preferably comprised of a rigid metal material or a rigid plastic material. Support member 24 may have any length from 2 inches to 20-30 inches or longer. Support member 24 includes a first end 26, a second end 28, a first side 30, a second side 32, an upper side 34, and a lower side 36. Side 32 has an L-shaped channel member 38 formed therewith which includes an upwardly extending portion 40 and a horizontally extending portion 42 to create a channel or pocket 44. Horizontally extending portion 42 is optionally provided with wire fastening holes or slots 45.

Support member 24 has a plurality of longitudinally spaced-apart mounting slots 46 formed therein inwardly of side 30. Although the slots 46 are shown to be parallel to side 30, the slots 30 could be transversely disposed with respect to side 30. Further, the slots 46 may be replaced with circular holes or threaded holes. Additionally, the slots 46 may be omitted and replaced with some sort of clamping device. In one embodiment, a support member 24 has a plurality of longitudinally spaced-apart holes or openings 48 formed therein which are positioned inwardly of side 32. A light member 50 is mounted in each of the openings 48 so as to direct light downwardly or outwardly from support member 24. Preferably, the light members 50 are of the glow type. The light members 50 may be LED's or some other type of indirect lights. Electric leads or wires 52 are electrically connected to the light members 50 and to the electrical system of the truck 12 to power the light members 50. The leads or wires 52 have portions thereof tucked or positioned in the channel 44 to protect the leads or wires 52 and to prevent the leads or wires 52 from hanging downwardly from the support member 24.

Figure 6:
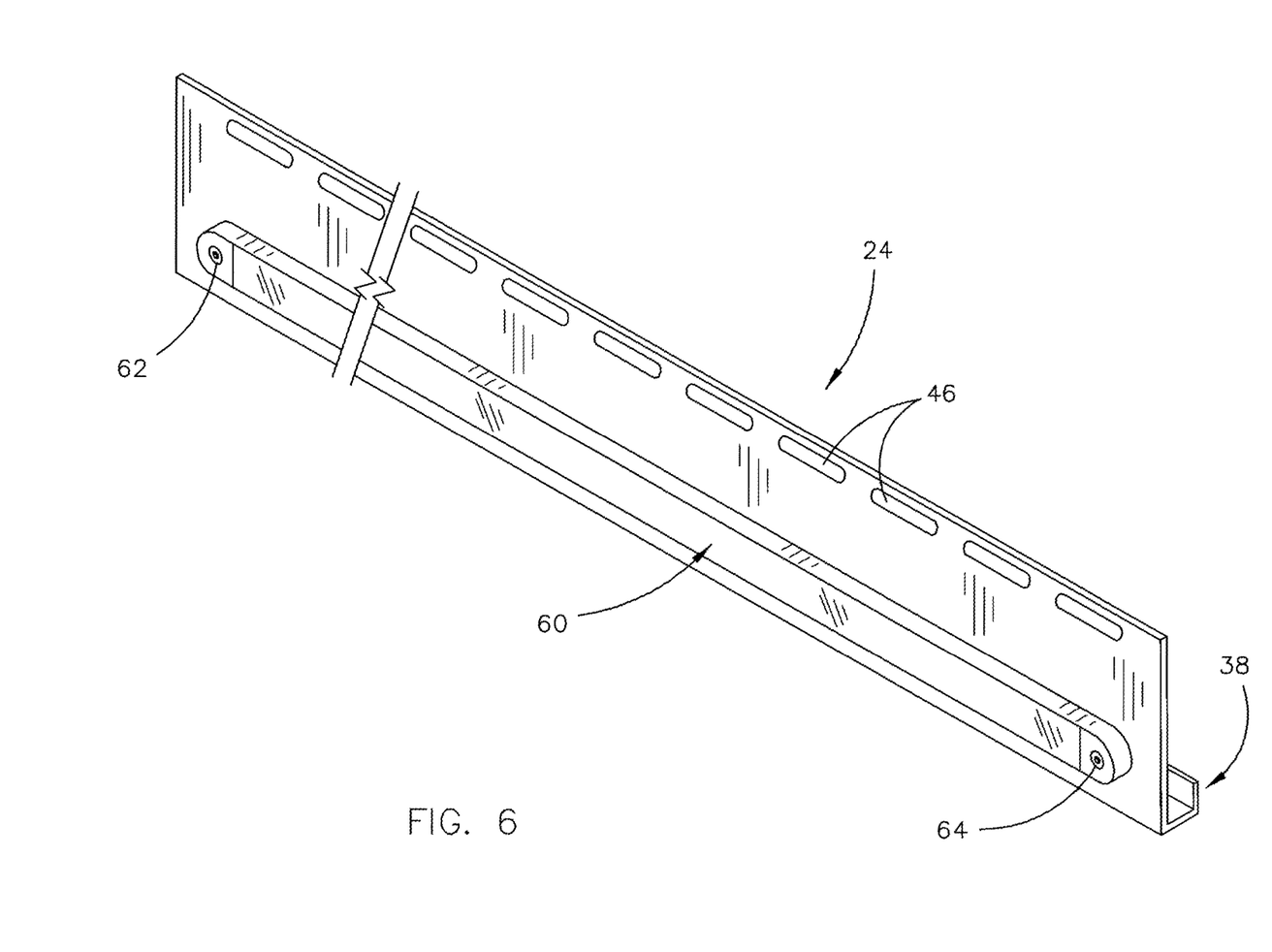
FIG. 6 is a partial perspective view of a modified form of the invention wherein an elongated light bar is substituted for the spaced-apart lights.
Figure 7:
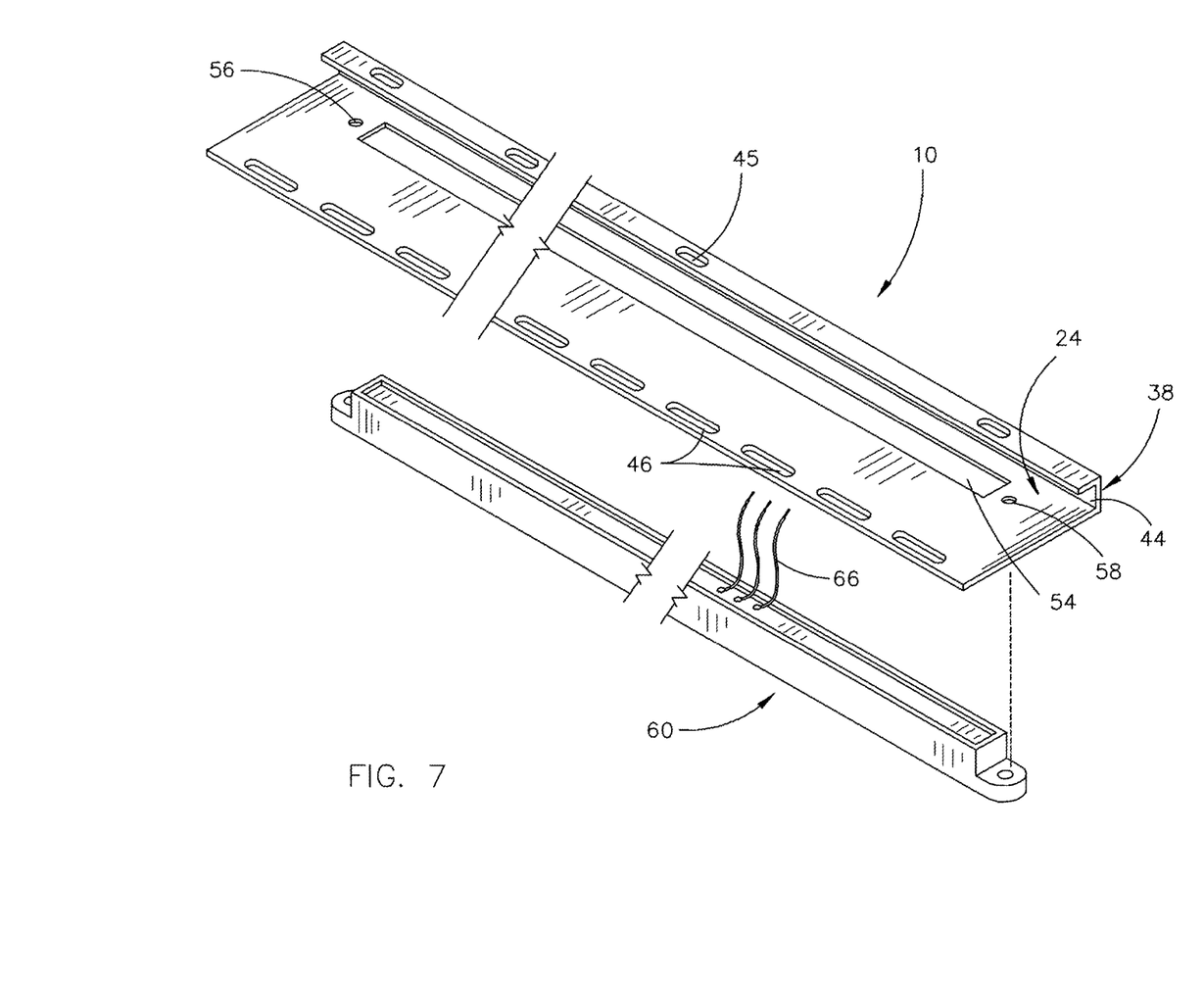
FIG. 7 is a partial exploded perspective view of the light bar of FIG. 6.

In a second embodiment, the light members 50 are not used. In the second embodiment, support member 24 has an elongated slot 54 formed therein. Screw openings 56 and 58 are formed in support member 24 at the ends of slot 54. An elongated light bar 60 is positioned in slot 54 and is held therein by screws 62 and 64. The electrical leads or wires 66 of light bar 60 may be positioned in channel 44. Although it is preferred that the L-shaped channel member 38 be used in both embodiments, the channel member 38 may be omitted in some situations.

Figure 1:
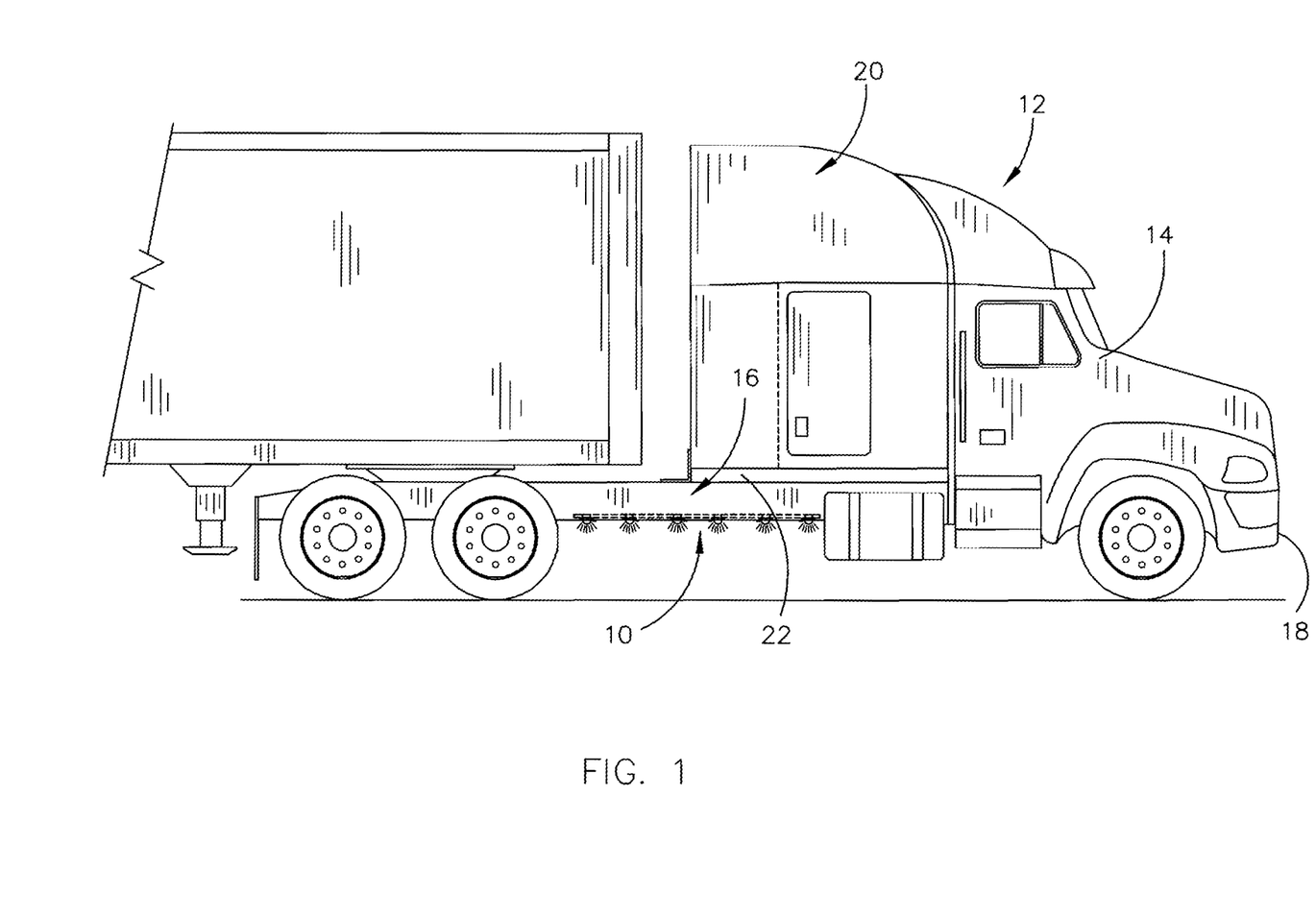
FIG. 1 is a side view illustrating the light assembly of this invention secured to one of the frame members of the truck.
Figure 8:
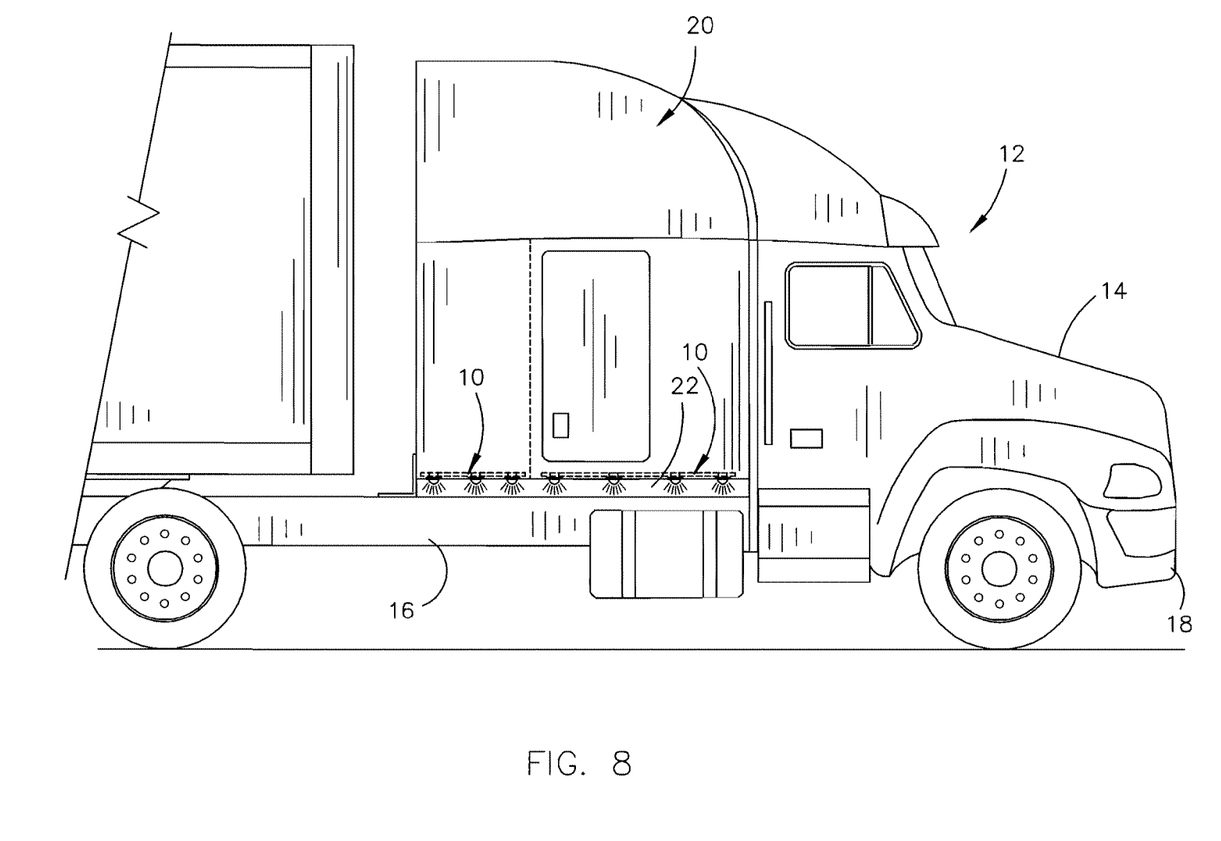
FIG. 8 is a side view illustrating the light assembly of this invention secured to one of the panels of the sleeper cab of the truck.
Figure 9:
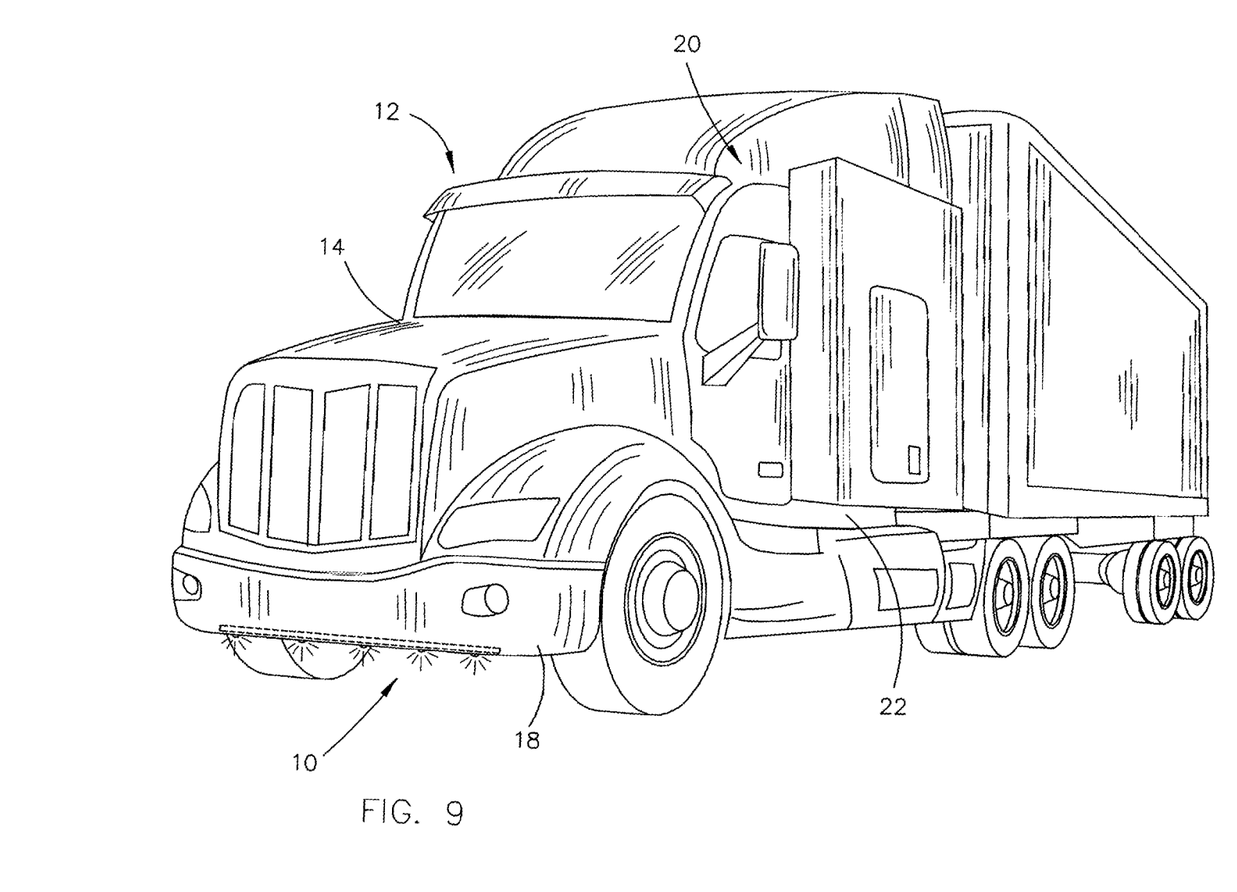
FIG. 9 is a front perspective view illustrating the light assembly of this invention secured to the front bumper of the truck.

The support member 24 may be secured to any part of the truck 12 or trailer by extending bolts 68 through the openings 46 and through holes or openings formed in the truck. As stated, the support member 24 may be secured to the truck 12 by a clamp or the like. FIG. 1 illustrates the light assembly 10 secured to one of the frame members of frame 16. FIG. 8 illustrates the light assembly 10 being secured to the side panels 22 of sleeper cab 20. FIG. 9 illustrates the light assembly 10 being secured to the front bumper 18 of the truck 12.

The support member 24 represents a vast improvement in the art in that the support member 24 is rigid and will not become disconnected from the part of the truck 12 to which it is attached.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A light assembly for attachment to a vehicle such as a truck, comprising:

an elongated and generally flat support member having a first end, a second end, a first side, a second side, an upper side and a lower side;

said support member having a plurality of horizontally spaced-apart mount openings formed therein;

an elongated L-shaped channel member at said second side of said support member which extends from said first end of said support member to said second end of said support member;

said L-shaped channel member including an upwardly extending portion, having lower and upper ends, which extends upwardly from said second side of said support member and including a horizontally extending portion, an inner end, an outer end, an upper side and a lower side, which extends inwardly from said upper end of said upwardly extending portion thereby creating an elongated channel at said second side of said support member;

said support member having a plurality of horizontally spaced-apart light mounting openings formed therein;

said electrical light mounting openings being formed in said support member at said inner end of said horizontally extending portion of said L-shaped channel member;

an electrical light member positioned in at least some of said light mounting openings;

each of said electrical light members having an upper end which is positioned above said upper side of said support member and a lower end which is positioned at said lower side of said support member;

each of said electrical light members having electrical wires extending from said upper end thereof to a source of electrical power;

said electrical wires which extend from said upper ends of said electrical light members being positioned in said elongated channel below said horizontally extending portion of said L-shaped channel and inwardly of upwardly extending portion to protect said electrical wires and to prevent said electrical wires from hanging downwardly from said support member; and said support member being configured to be attached to the truck.

2. A light assembly for attachment to a vehicle such as a truck, comprising:

an elongated and generally flat support member having a first end, a second end, a first side, a second side, an upper side and a lower side;

said support member having a plurality of horizontally spaced-apart mount openings formed therein;

an elongated L-shaped channel member at said second side of said support member which extends from said first end of said support member to said second end of said support member;

said L-shaped channel member including an upwardly extending portion, having lower and upper ends, which extends upwardly from said second side of said support member and including a horizontally extending portion, an inner end, an outer end, an upper side and a lower side, which extends inwardly from said upper end of said upwardly extending portion thereby creating an elongated channel at said second side of said support member;

said support member having an elongated opening formed therein which is configured to permit the passage of light downwardly therethrough;

an electrical light bar positioned on said upper side of said support member which is configured to direct light downwardly through said elongated opening;

said light bar having electrical wires extending therefrom to a source of electrical power;

said electrical wires which extend from said light bar being positioned in said elongated channel below said horizontally extending portion of said L-shaped channel and inwardly of upwardly extending portion of said L-shaped channel to protect the electrical wires and to prevent said electrical wires from hanging downwardly from said support member; and said support member being configured to be attached to the truck.

* * * * *